United States Patent [19]

Krude

[11] Patent Number: 4,596,299

[45] Date of Patent: Jun. 24, 1986

[54] INDEPENDENT WHEEL SUSPENSION SYSTEM USING CONSTANT VELOCITY UNIVERSAL JOINTS IN COMBINATION WITH A SINGLE PROP SHAFT JOINT AND MOUNTED DIFFERENTIALS

[75] Inventor: Werner Krude, Grosse Pointe Park, Mich.

[73] Assignee: GKN Automotive Components Inc., Southfield, Mich.

[21] Appl. No.: 586,022

[22] Filed: Mar. 5, 1984

[51] Int. Cl.⁴ ............................................. B60K 20/00
[52] U.S. Cl. ................................. 180/73.2; 180/73.3; 180/73.4
[58] Field of Search ................. 180/73.1, 73.2, 73.3, 180/73.4, 264

[56] References Cited

U.S. PATENT DOCUMENTS

| | | | |
|---|---|---|---|
| 3,245,490 | 4/1966 | Muller | 180/73.2 |
| 3,876,029 | 4/1975 | von der Ohe | 180/73.3 |
| 3,892,284 | 7/1975 | Braess et al. | 180/73.3 |

FOREIGN PATENT DOCUMENTS

| | | | |
|---|---|---|---|
| 1430938 | 12/1968 | Fed. Rep. of Germany | 180/73.2 |
| 2440506 | 3/1976 | Fed. Rep. of Germany | 180/73.4 |
| 1505697 | 1/1979 | Fed. Rep. of Germany | 180/73.4 |

*Primary Examiner*—Edward G. Favors
*Assistant Examiner*—Steven E. Warner
*Attorney, Agent, or Firm*—Remy J. VanOphem

[57] ABSTRACT

An independent wheel suspension system having a transverse support member attached between the side frame members of a vehicle frame, a semi-trailing arm having a wheel end coupled to the wheel assembly and a pair of spaced-apart support sections pivotably coupled to the transverse support member, a differential rotatably coupled to the transverse support member to allow relative movement therebetween about a transverse pivot axis, and a prop shaft coupling the differential and engine with only one universal joint, that joint being of the constant velocity plunging type, whereby the differential is allowed to pivot about the transverse pivot axis to accommodate articulation between the prop shaft and the engine.

5 Claims, 7 Drawing Figures

INDEPENDENT WHEEL SUSPENSION SYSTEM USING CONSTANT VELOCITY UNIVERSAL JOINTS IN COMBINATION WITH A SINGLE PROP SHAFT JOINT AND MOUNTED DIFFERENTIALS

CROSS-REFERENCE TO RELATED APPLICATIONS

This patent application is related to the following copending applications assigned to the common assignee hereof:

U.S. Ser. No. 586,086, filed Mar. 5, 1984, entitled "Independent Wheel Suspension System Using Thrust Bearing Constant Velocity Universal Drive Joints As Suspension Members";

U.S. Ser. No. 586,012, filed Mar. 5, 1984, entitled "Independent Wheel Suspension System Using Thrust Bearing Constant Velocity Universal Drive Joints, Bending and Torsional Motion Resistance Suspension Members And A Transversely Pivotable Differential";

U.S. Ser. No. 586,056, filed Mar. 5, 1984, entitled "Independent Wheel Suspension System Using Thrust Bearing Constant Velocity Universal Drive Joints As Suspension Members In Combination With A Single Prop Shaft Joint And A Transversely Pivotable Differential";

U.S. Ser. No. 586,011, filed Mar. 5, 1984 entitled "Independent Wheel Suspension System Using Thrust Bearing Constant Velocity Universal Drive Joints As Suspension Members To Minimize Wheel Camber";

U.S. Ser. No. 586,098, filed Mar. 5, 1984 entitled "Independent Wheel Suspension Using Thrust Bearing Constant Velocity Universal Drive Joints As Suspension Members In Combination With A Wheel Assembly And Differential Coupled To Pivot About A Transverse Stabilizer"; and U.S. Ser. No. 586,054, files Mar. 5, 1984 entitled "Independent Wheel Suspension System Having a Differential Pivotable About Two Axes".

BACKGROUND OF THE INVENTION

1. Field of the Invention

This invention relates toindependent wheel suspension systems and, more particularly, to independent wheel suspension systems wherein differentials are not rigidly mounted to the vehicle frame.

2. Description of the Prior Art

It is known, as disclosed in the U.S. Pat. No. 2,968,357 to Roller, to reduce the anti-squat of the rear end of a vehicle produced during vehicle acceleration while also isolating roadnoise by allowing a vehicle differential to pivot on resilient bushings supported by a pair of transverse trunnion shafts from the side rails of a behicle frame. However, the Roller reference also includes an abutment structure preventing rotation of the differential in one direction relative to the support frame while normally restraining motion in the other direction, except under accleeration in excess of a predetermined acceleration. Moreover, the Roller structure also includes the universal coupling between the prop shaft and differential to accommodate momentary changes in the angular inclination of the differential.

The U.S. Pat. No. 3,625,300 to Barenyi and Wilfert discloses the suspension of an axle unit of a motor vehicle by a support member premitting pivoting of the wheel pair in relation to the vehicle super-structure about two mutually perpendicular essentially horizontal axes, but without allowing any relative movement about either axis between the wheels and the axle gear housing.

The present invention recognizes that it is desireable to allow the differential to pivot relative to the frame as the frame undergoes a displacement relative to the driving sufrace between a normal position, a fully loaded position, and an unloaded position. The present invention further recognizes that, wiht the differential free to pivot relative to the support frame, such pivoting can accommodate the function otherwise served by the universal coupling between the prop shaft and the differential to thereby allow the elimination of this universal coupling.

In accordance with the present invention, a pair of pivot pins defining a transverse axis are carried by extension mambers projecting from opposite sides of a differential housing and a pair of journal members mating with these pivot pins are carried by a transverse frame member to allow the differentail to pivot about the transverse axis as well as to pivot about the differential output axis. Resilient bushings are interposed between the pivot pins and journal members to dampen engine, differential and road vibrations. A prop shaft couples the engine to the differential, the coupling at the engine end of the prop shaft being of the constant velocity universal type and the coupling at the differential end of the prop shaft being of the sliding splined type. the universal coupling allows the prop shaft to undergo an articulation relative to the engine as the vehicle frame undergoes a displacement relative to the driving surface. This articulation is accommodated by a corresponding pivoting motion of the differential relative to the transverse axis while at the same time keeping the prop shaft axis coaxial with the input axis of the differential.

It is therefore, an object of the present invention to provide a new and improved independent wheel suspension system.

It is another primary object of the present invention to provide a new and improved independent wheel suspension system, wherein the vehicle differential is allowed to pivot relative to a vehicle frame to accommodate articulation between a prop shaft and an engine as the vehicle frame undergoes displacement relative to a driving surface.

It is another primary object of the present invention to provide an independent wheel suspension system having a differential pivotable about more than one axis.

It is a further object of the present invention to provide an independent wheel suspension of the foregoing type, wherein the prop shaft is coupled to the differential by a joint that prohibits articulation between the prop shaft axis and the input axis of the differential.

It is a further object of the present invention to provide an independent wheel suspension system of the foregoing type, wherein the pivot means allowing the differential to pivot relative to the transverse axis of the transverse frame member further includes resilient bushings for dampening vibrations of the engine or differential.

These and other features and objects of the present invention will become more apparent ot those skilled in the art from the following detailed description of a preferred embodiment taken in conjunction with the drawing appended hereto.

DETAILED DESCRIPTION OF THE PREFERRED EMBODIMENT

Figure 1:
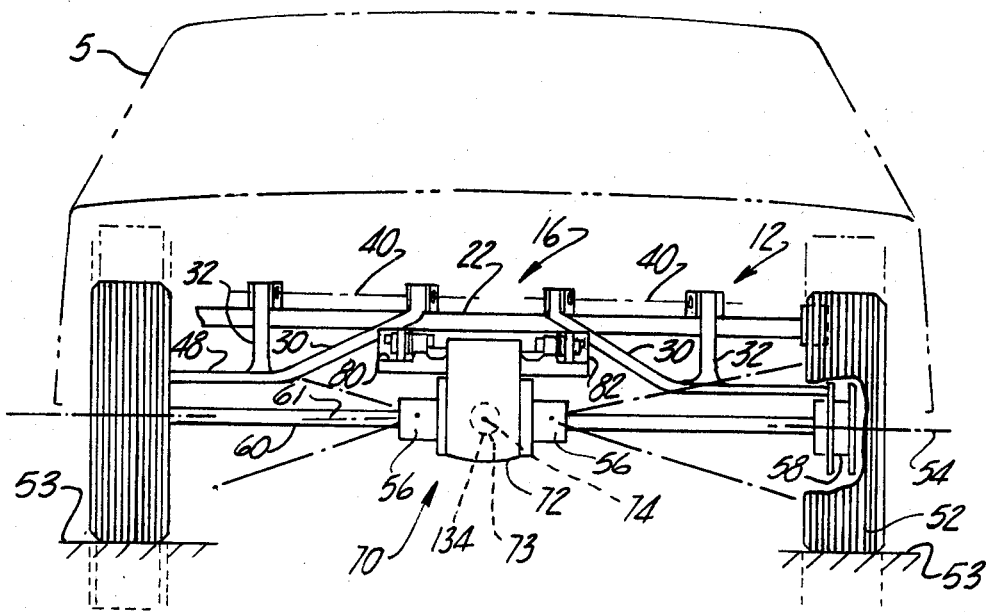
FIG. 1 is a schematic rear view of an independent wheel suspension system wherein the vehicle differential pivots about the transverse axis and differential output axis in accordace with the present invention.
Figure 2:
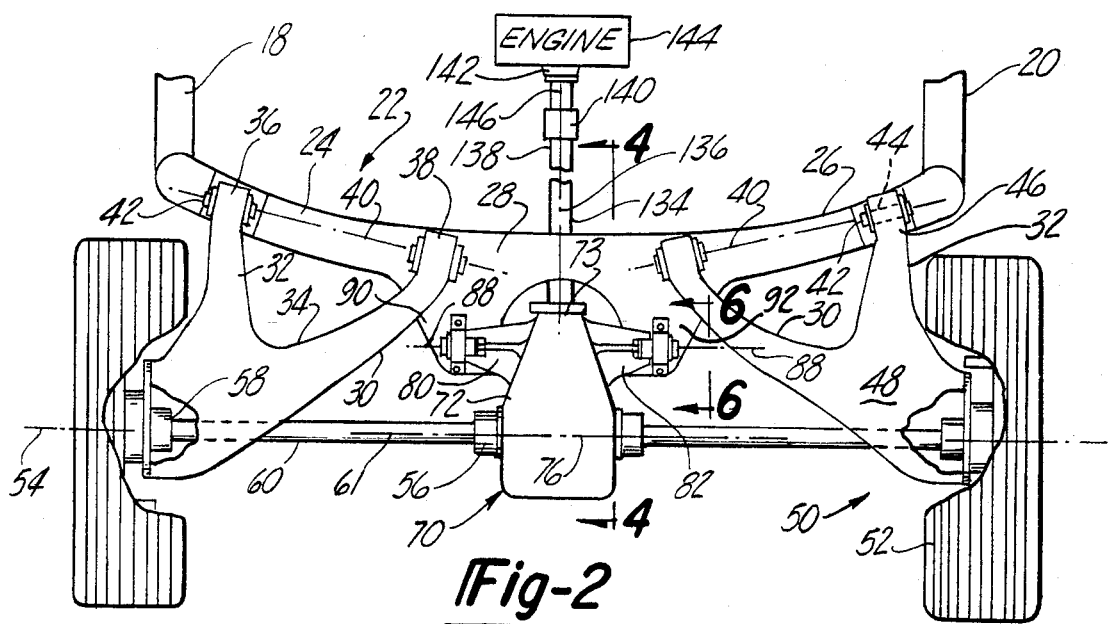
FIG. 2 is a plan view of the independent wheel suspension system provided in accordance with the present invention.
Figure 4:
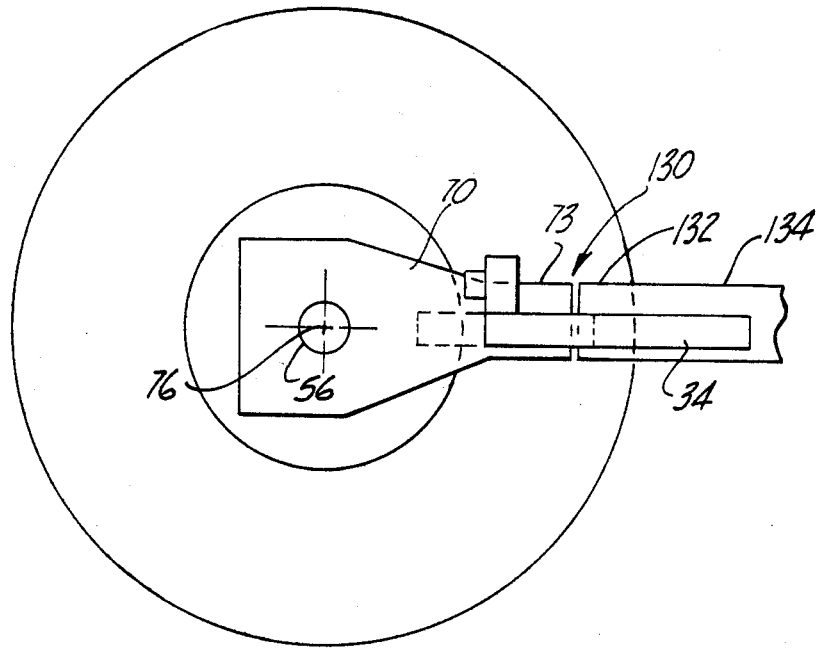
FIG. 4 is a sectional view taken along line 4—4 of FIG. 2.

With reference mow to FIGS. 1 and 2, there is shown a rear view of a four-wheeled motor vehicle which includes a body 5 mounted to a chassis 12 supported in a known manner, such as by shock absorbers, from the vehicle support means in the form of a vehicle frame 16 that includes a pair of spaced-apart longitudinal frame members 18 and 20 securing therebetween at least one transverse subframe member 22. Chassis and/or chassis support means, as used herein, are intended to include a vehicle made of unitary construction wherein some of the chassis components are provided in the body of the vehicle.

The transverse subframe 22 includes a pair of outboard portions 24 and 26 spaced outboard from a centrally located differential mounting structure 28. Each respective outboard portion 24 and 26 is coupled to an inner and an outer arm portion, 30 and 32, respectively, of a semi-trailing arm 34 by a pair of pivot mountings 36 and 38, respectively, establishing two bearing points defining a swing axis 40 therebetween. Each of the pivot mountings 36 and 38 include known means for allowing the semi-trailing arm 34 to pivot relative to the transverse subframe member 22 about the swing axis 40, each of such pivot mountings 36 and 38 including a pivot pin 42 carried by resilient annular bushings 44 secured to the semi-trailing arm 34 by a mounting cap 46.

Figure 3:
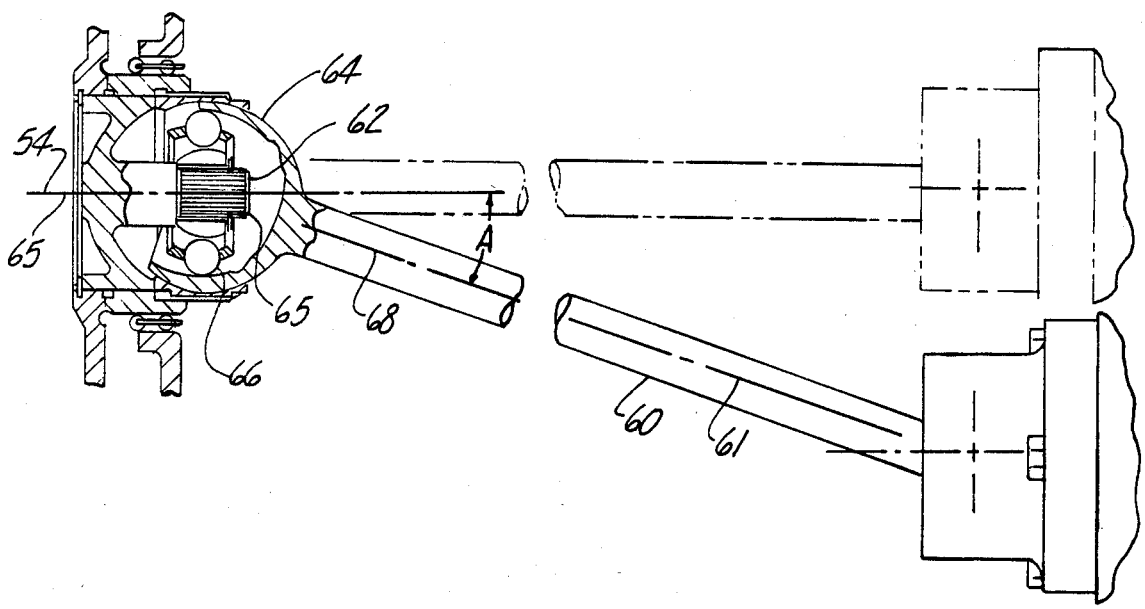
FIG. 3 is a view, partially ion cross-section, of one type of universal joint suitable for use with the invention.
Figure 7:
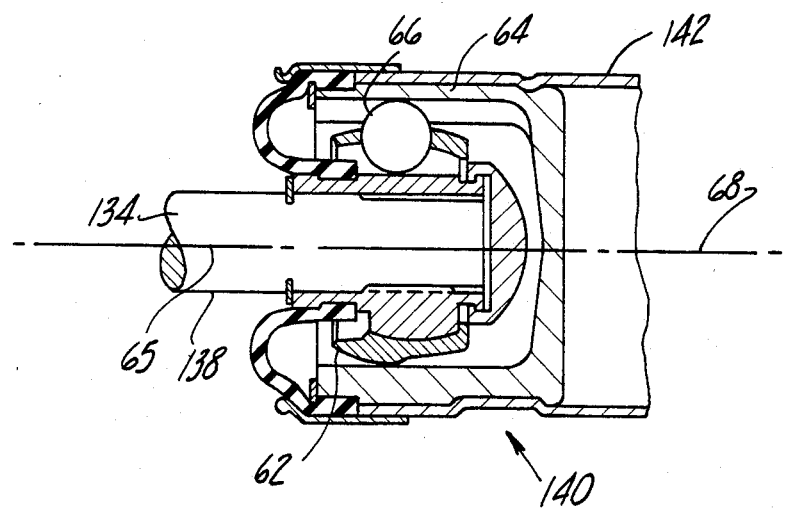
FIG. 7 is an elevational, partially in cross-section, of a universal joint of the type that may be used to couple the prop shaft to the engine output in accordance with the present invention, as well as which may be used to couple either the outboard joint to the wheel or the inboard joint to the differential output.

Each semi-trailing arm 34 also includes a wheel end 48 suitably connected in a known manner to a wheel assembly 50 including a wheel 52 adapted to rotate about a wheel axis 54 in engagement with a driving surface 53. Each wheel assembly 50 is universally coupled by an inboard and an outboard universal joint 56 and 58 at the inboard and outboard ends of a drive shaft 60 to a differential 70. Each of the universal joints 56 and 58 are of the constant velocity universal joint type shown in FIGS. 3 and 7.

Eash such universal joint includes and inner member 62 and an outer member 64 coupled by six equally-spaced balls 66 to permit an inner member axis 65 to articulate along a homokinetic plane through a joint articulation angle A with respect to an outer member axis 68 or drive output 61.

The differential 70 includes a differential housing 72 containing an input pinion (not shown). The differential 70 is rotatable about a differential input axis 74 and is coupled to a pair of side bevelled gears (not shown) spaced on opposite sides of a differential output axis 76 and adapted to redirect a driving torque applied to the input pinion about the differential input axis laterally outwards therefrom about the differential output axis 76 perpendicular to the differential input axis 74, to the inboard joint member. The differential output axis 76 is coaxial with one of the inboard constant velocity joint members, and the driving torque is coupled to the other joint member along the drive axis 61 of the drive shaft 60.

Projecting laterally from the differential housing 72 in opposite directions aling the differential input axis 74 are respective extension members 80 and 82 adapted to be pivotably coupled to the central differential mounting structure 28. The extension member 80 and 82 extend laterally from the differential housing 72 in opposite directions from the differential input axis 74. As is shown in FIG. 5 with respect to the extension member 82, each extension member 80 and 82 includes a laterally disposed mounting hub 84 having a bore 86 therethrough coaxial about a transverse pivot axis 88 substantially parallel to the differential output axis 76 and spaced forwardly thereof.

Figure 6:
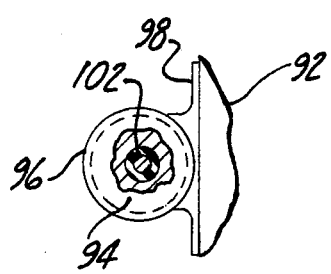
FIG. 6 is a partial cut away side view along lines 6—6 of FIG. 2 showing the pivotal mounting according to the invention.

The central differential mounting structure 28 includes a pair of laterally disposed differential mounting sections 90 and 92 extending rearwardly from the transverse subframe member 22 to underlie the outer structural extension members of the differential housing 72 along the pivot axis 88. As shown in FIG. 6 with respect to the differential mounting section 92, each of the differential mounting sections 90 and 92 have an annular resilient bushing 94 secured thereto by a bushing cap 96 fastened to a lateral upper surface of each of the differential mounting sections 90 and 92 by appropriate fastening means. Each annular resilient bushing 94 pivotally supports a bushing portion 100 of a pivot pin 102 having a hub portion 104 journalled in the bore 86 of the mounting hub 84. One end of the pivot pin 102 is terminated in a stud head 106 bearing against the inboard radial hub surface 108 of the mounting hub 84. The resilient bushing is mounted between an inboard radial washer 112 and an outboard radial thrust washer 114. A nut 116 threadedly engages the other end of the pivot pin 102 bearing against an outboard radial bushing surface 118 of the thrust washer 114.

Figure 5:
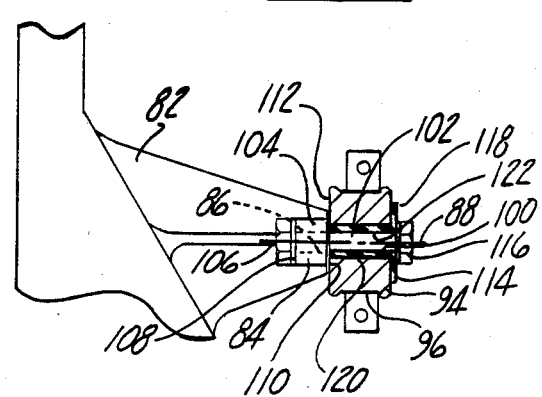
FIG. 5 is a fragmentary view, partially in cross-section and at an enlarged scale, showing the pivotal mounting of the differential in greater detail.

As best seen in the cross-sectionsl view of FIG. 5, a radial clearance 120 is provided between the bushing portion 100 of the pivot pin 102 and a bore 122 of the annular resilient bushing. The radial clearance 120 is selected to allow angular movement of the pivot pin 102, and thereby the differential housing 72 by plus or minus four degrees in both directions about the transverse pivot axis 88 relative to the annular resilient bushing 94 and in, turn, therethrough to the transverse subframe member 22.

The differential input 73 of the differential 70 is coupled by a sliding splined coupling 130 to the differential end 132 of a prop shaft 134 having a prop shaft axis 136 therethrough. The sliding splined coupling 30 causes the prop shaft axis 136 to be coaxial with the differential input axis 74. The prop shaft 134 has an engine end 138 coupled by a universal coupling in the form of a constant velocity universal joint 140 to the engine output 142 of an engine 144 adapted to develop a driving torque about an engine output axis 146. The constant velocity universal joint 140 permits an articulation between the prop shaft axis 136 and the engine output axis 146. The articulation results from the position of the engine output 142 relative to the differential input 73, such positioning being effected either by intentional design or by displacement of the vehicle frame 16 relative to the driving surface 53.

The foregoing engine-to-prop-shaft articulation imparted at the constant velocity universal joint 140 is accommodated by the axial slippage afforded by the sliding splined connection 130 in cooperation with the pivoting about the transverse pivot axis 88 of the differential 70 relative to the transverse subframe member 22.

Those skilled in the art will recognize that the vehicle suspension system described herein may also include various combinations of helical springs, leaf springs, shock absorbers and other well known dampening suspension devices.

Although the best mode contemplated by the inventor for carrying out the present invention as of the filing date hereof has been shown and described herein, it will be apparent to those skilled in the art that suitable modifications, variations, and equivalents may be made without departing from the scope of the invention. For example, it is obvious that the structure providing the pivoting movement about the transverse pivot axis 88 may be interchanged between the differential 70 and the transverse subframe member 22. It is also obvious that the sliding splined coupling 130 may be replaced by a non-sliding coupling and a plunging type of constant velocity universal joint such as shown in greater detail in FIG. 7 and U.S. Pat. No. 3,688,521 to Smith and Hughes issued Sept. 5, 1972, the specification of which is hereby incorporated herein by reference. The invention is to be limited solely by the terms of the following claims.

What is claimed is:

1. An independent wheel suspension system for a vehicle having a chassis, vehicle support means for resiliently supporting said chassis for displacement with respect to a driving surface, a wheel assembly with a wheel rotatable about a wheel axis, and an engine adapted to provide driving torque about an engine output axis at an engine output, said independent wheel suspension system comprising:
   control arm means having a wheel end pivotably connected to said wheel assembly and a pair of frame ends pivotably connected to a respective pair of pivot bearings carried by said vehicle support means to define a swing axis therethrough;
   differential means comprising a differential housing, differential input means and differentail output means within said differential housing establishing a respective differential input axis and a differential output axis substantially perpendicular thereto;
   transverse pivot means coupling said differential means and said vehicle support means for allowing said differential means to pivot relative to said vehicle support means about a transverse pivot axis substantially parallel to said differential output axis; and
   prop shaft means having a prop shaft axis and first and second prop shaft coupling means coupling, respectively, to said engine output and said differential input, said first prop shaft coupling means being a constant velocity universal joint, said second prop shaft coupling means being one of an axially splined joint or a fixed joint;
   whereby, as said first prop shaft coupling means undergoes articulation with respect to said prop shaft means as said chassis undergoes said displacement, said transverse pivot means allows said differential means to pivot relative to said vehicle support means about said transverse pivot axis to accommodate said articulation without articulation between said differential means and said prop shaft means.

2. The independent wheel suspension system of claim 1, wherein said transverse pivot means comprises bearing means and journal means rotatably supported by said bearing means, one of said bearing means or said journal means being connected to one of said differential housing or said vehicle support means and the other of said bearing means or said journal means being connected to the other of said differential or said vehicle support means, said bearing means and said journal means cooperating to establish said transverse pivot axis.

3. An independent wheel suspension system for a vehicle having a chassis, vehicle support means for resiliently supporting said chassis for displacement with respect to a driving surface, a wheel assembly with a wheel rotatable about a wheel axis, and an engine adapted to provide driving torque about an engine output axis at an engine output, said independent wheel suspension system comprising:
   control arm means having a wheel end pivotably connected to said wheel assembly and a pair of frame ends pivotably connected to a respective pair of pivot bearings carried by said vehicle support means to define a swing axis therethrough;
   differential means comprising a differential housing, differential input means and differential output means within said differential housing establishing a respective differential input axis and a differential output axis substantially perpendicular thereto;
   transverse pivot means coupling said differential means ad said vehicle support means for allowing said differential means to pivot relative to said vehicle support means about a transverse pivot axis substantially parallel to said differential output axis, said transverse pivot means comprising bearing means and journal means rotatably supported by said bearing means, one of said bearing means or said journal means being connected to one of said defferential housing or said vehicle support means and the other of said bearing means of said journal means being connected to the other of said differential or said vehicle support means, said bearing means and said journal means cooperating to establish said transverse pivot axis, said transverse pivot means fruther comprising resilient bushing means interposed said bearing means and said journal means for dampening vibrations produced by said engine and said differential means; and
   prop shaft means having a prop shaft axis and first and second prop shaft coupling means coupling, respectively, to said engine output and said differential input, one of said first or second prop shaft coupling means being a constant velocity universal joint, the other of said prop shaft coupling means being one of an axially splined joint or a fixed joint; whereby, as said one joint undergoes articulation as said chassis undergoes said displacement, said transverse pivot means allows said differential means to pivot relative to said vehicle support means about said transverse pivot axis to accommodate said articulation.

4. The independent wheel suspension suystem of claim 3, wherein said resilient bushing means allow said transverse pivot axis to have a predetermined angular offset with respect to an axis parallel to said differential output axis.

5. The independent wheel suspension system of claim 4, wherein said predetermined angular variation is plus or minus four degrees.

* * * * *

UNITED STATES PATENT AND TRADEMARK OFFICE
CERTIFICATE OF CORRECTION

PATENT NO. : 4,596,299

DATED : June 24, 1986

INVENTOR(S) : Werner Krude

It is certified that error appears in the above-identified patent and that said Letters Patent is hereby corrected as shown below:

Column 1, line 37, delete " files " and insert ---- filed ----.

Column 1, line 43, delete " toindependent " and insert ---- to independent ----.

Column 1, line 51, delete " roadnoise " and insert ---- road noise ----.

Column 1, line 54, delete " behicle " and insert ---- vehicle ----.

Column 1, line 58, delete " accleeration " and insert ---- acceleration ----.

Column 1, line 65, delete " premitting " and insert ---- permitting ----.

Column 2, line 3, delete " desireable " and insert ---- desirable ----.

UNITED STATES PATENT AND TRADEMARK OFFICE
CERTIFICATE OF CORRECTION

PATENT NO. : 4,596,299

DATED : June 24, 1986

INVENTOR(S) : Werner Krude

Page 2 of 4

It is certified that error appears in the above-identified patent and that said Letters Patent is hereby corrected as shown below:

Column 2, line 7, delete " sufrace " and insert ---- surface ----.

Column 2, line 8, delete " wiht " and insert ---- with ----.

Column 2, line 17, delete " mambers " and insert ---- members ----.

Column 2, line 20, delete " differentail " and insert ---- differential ----.

Column 2, line 29, delete " the " and insert ---- The ----.

Column 2, line 38 after is insert a comma ---- , ----.

Column 2, line 61, delete " resilent " and insert ---- resilient ----.

UNITED STATES PATENT AND TRADEMARK OFFICE
CERTIFICATE OF CORRECTION

PATENT NO. : 4,596,299

DATED : June 24, 1986

INVENTOR(S) : Werner Krude

It is certified that error appears in the above-identified patent and that said Letters Patent is hereby corrected as shown below:

Column 2, line 65, delete " ot " and insert ---- to ----.

Column 2, line 68, delete " drawing " and insert ---- drawings ----.

Column 3, line 10, delete " ion " and insert ---- in ----.

Column 3, line 67, delete "Eash" insert -- Each --.

Column 3, line 30, delete " mow " and insert ---- now ----.

Column 3, line 67, delete " and " and insert ---- an ----.

Column 4, line 4, after " output " insert ---- axis ----.

Column 4, line 20, delete " aling " and insert ---- along ----.

Column 4, line 23, delete " member " and insert ---- members ----.

Column 4, line 54, delete " cross-sectionsl " and insert ---- cross-sectional ----.

UNITED STATES PATENT AND TRADEMARK OFFICE
CERTIFICATE OF CORRECTION

PATENT NO. : 4,596,299
DATED : June 24, 1986
INVENTOR(S) : Werner Krude

It is certified that error appears in the above-identified patent and that said Letters Patent is hereby corrected as shown below:

Column 4, line 67, delete " 30 " and insert ---- 130 ----.

Column 6, line 46, delete " ad " and insert ---- and ----.

Column 6, line 54, delete " defferential " and insert ---- differential ----.

Column 5, line 60, delete " fruther " and insert ---- further ----.

Column 8, line 1, delete " suystem " and insert ---- system ----.

Signed and Sealed this

Twenty-eighth Day of October, 1986

[SEAL]

*Attest:*

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,596,299
DATED : June 24, 1986
INVENTOR(S) : Werner Krude

It is certified that error appears in the above-identified patent and that said Letters Patent is hereby corrected as shown below:

Column 3, line 6, delete "accordace" and insert ---- accordance ----.

Column 5, line 57, delete "differentail" and insert ---- differential ----.

Column 6, line 60, delete "fruther" and insert ---- further ----.

Signed and Sealed this

Thirtieth Day of December, 1986

Attest:

DONALD J. QUIGG

Attesting Officer

Commissioner of Patents and Trademarks